US009388957B2

(12) United States Patent
Hsu et al.

(10) Patent No.: US 9,388,957 B2
(45) Date of Patent: Jul. 12, 2016

(54) SECONDARY OPTICAL ELEMENT AND LIGHT SOURCE MODULE

(71) Applicant: National Chiao Tung University, Hsinchu (TW)

(72) Inventors: Yu-Kai Hsu, Hsinchu (TW); Jui-Wen Pan, Hsinchu (TW); Yung-Chih Huang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 66 days.

(21) Appl. No.: 14/469,590

(22) Filed: Aug. 27, 2014

(65) Prior Publication Data

US 2015/0345735 A1 Dec. 3, 2015

(30) Foreign Application Priority Data

May 30, 2014 (TW) .............................. 103119027 A

(51) Int. Cl.
*F21V 5/00* (2015.01)
*F21V 5/04* (2006.01)
(Continued)

(52) U.S. Cl.
CPC . *F21V 5/007* (2013.01); *F21K 9/50* (2013.01); *F21V 5/048* (2013.01); *G02B 19/00* (2013.01); *F21V 5/04* (2013.01); *F21Y 2101/02* (2013.01); *F21Y 2105/001* (2013.01)

(58) Field of Classification Search
CPC ..... F21V 5/007; F21V 5/048; F21Y 2101/02; F21Y 2105/001; F21K 9/50
USPC .................................................. 362/311.02
See application file for complete search history.

(56) References Cited

U.S. PATENT DOCUMENTS 8,070,326 B2 * 12/2011 Lee .................... G02B 19/0061
  359/738
2010/0238669 A1 * 9/2010 Holder ...................... F21K 9/00
  362/311.02

(Continued)

FOREIGN PATENT DOCUMENTS

CN 201527988 7/2010
CN 102478173 5/2012

(Continued)

OTHER PUBLICATIONS

Hsiao-Wen Lee, et al., "Improvement of illumination uniformity for LED flat panel light by using micro-secondary lens array," Optics Express, Nov. 5, 2012, vol. 20, No. S6, pp. A788-pp. A798.

(Continued)

Primary Examiner — Laura Tso
(74) Attorney, Agent, or Firm — Jianq Chyun IP Office

(57) ABSTRACT

A secondary optical element including a light incidence surface, a light emitting surface, and a connecting surface is provided. The light incidence surface includes a first and a second light incidence surfaces. The first light incidence surface is a curved surface recessed toward the light emitting surface. The light emitting surface is opposite to the light incidence surface and includes a first and a second light emitting surfaces. The first light emitting surface is a free-form surface recessed toward the light incidence surface or a flat surface. The second light emitting surface is a free-form surface. A diameter of the second light emitting surface is larger than a diameter of the second light incidence surface, and the connecting surface is connected between the second light incidence surface and the second light emitting surface. A light source module is also provided.

8 Claims, 3 Drawing Sheets

(51) Int. Cl.
*F21K 99/00* (2016.01)
*G02B 19/00* (2006.01)
*F21Y 101/02* (2006.01)
*F21Y 105/00* (2016.01)

(56) References Cited

U.S. PATENT DOCUMENTS

| | | | | |
|---|---|---|---|---|
| 2010/0328958 | A1* | 12/2010 | Zhang | F21V 5/04 362/311.02 |
| 2013/0128590 | A1* | 5/2013 | Chang | F21V 5/04 362/296.01 |
| 2014/0160766 | A1* | 6/2014 | Chinniah | F21V 7/0091 362/308 |
| 2014/0177235 | A1* | 6/2014 | Lin | F21V 5/04 362/311.02 |

FOREIGN PATENT DOCUMENTS

| | | |
|---|---|---|
| CN | 203162593 | 8/2013 |
| CN | 103672731 | 3/2014 |
| EP | 2476943 | 7/2012 |
| EP | 2653776 | 10/2013 |
| TW | M456499 | 7/2013 |
| TW | M473473 | 3/2014 |

OTHER PUBLICATIONS

Yi Ding, et al., "Freeform LED lens for uniform illumination," Optics Express, Aug. 18, 2008, vol. 16, No. 17, pp. 12958-pp. 12966.

Kai Wang, et al., "New reversing design method for LED uniform illumination," Optics Express, Jul. 4, 2011, vol. 19, No. S4, pp. A830-pp. A840.

Office Action of Taiwan Counterpart Application, issued on Mar. 2, 2016, p. 1-p. 5.

* cited by examiner

SECONDARY OPTICAL ELEMENT AND LIGHT SOURCE MODULE

CROSS-REFERENCE TO RELATED APPLICATION

This application claims the priority benefit of Taiwan application serial no. 103119027, filed on May 30, 2014. The entirety of the above-mentioned patent application is hereby incorporated by reference herein and made a part of this specification.

BACKGROUND OF THE INVENTION

1. Field of the Invention

The invention generally relates to a secondary optical element and a light source module, and more particularly to a secondary optical element with uniform illumination and a light source module applying the secondary optical element.

2. Description of Related Art

Due to advantages such as fast response, small volume, low power consumption and waste, high reliability, and fit for mass production, the light emitting diode (LED) has been widely applied in such fields as illumination and backlight source. In LED illumination, the LED emits a Lambertian emission pattern; this type of emission pattern exhibits an uneven illumination on the target illumination plane. When extremely high luminance or luminance contrast exists within the field of view of human vision, discomfort may be generated by the human eyes. Therefore, an important focus area is in reducing glare and improving illumination uniformity.

In conventional techniques, illumination equipments used to reduce glare include the side-lit panel light and the traditional grille lamp, which utilizes light guide design or reflector design to control the light emission pattern and to eliminate the high luminance or luminance contrast within the field of vision. However, these equipments have low light extraction efficiency. Accordingly, how to reduce glare and improve illumination uniformity while obtaining high light extraction efficiency is an important topic of research and development.

SUMMARY OF THE INVENTION

The invention provides a secondary optical element capable of reducing glare and enhancing illumination uniformity.

The invention provides a light source module having a high light extraction efficiency.

The secondary optical element is adapted to be disposed over a light emitting element. The secondary optical element includes a light incidence surface, a light emitting surface, and a connecting surface, in which the light incidence surface includes a first light incidence surface and a second light incidence surface surrounding the first light incidence surface. Moreover, the first light incidence surface is a curved surface recessed toward the light emitting surface. The light emitting surface is opposite to the light incidence surface and includes a first light emitting surface and a second light emitting surface surrounding the first light emitting surface. The first emitting surface is a flat surface or a free-form surface recessed toward the light incidence surface. The second light emitting surface is a free-form surface. A diameter of the second light emitting surface is larger than a diameter of the second light incidence surface, and the connecting surface is connected between the second light incidence surface and the second light emitting surface.

According to an embodiment of the invention, the first light incidence surface, the second light incidence surface, the first light emitting surface, and the second light emitting surface have a same center axis.

According to an embodiment of the invention, the first light incidence surface is a circular arc surface. The light emitting element has a light exiting surface located below the first light incidence surface, and a maximum distance between the light exiting surface and the first light incidence surface along a direction perpendicular to the light exiting surface is less than a radius of curvature of the first light incidence surface.

According to an embodiment of the invention, a diameter of the first light incidence surface is larger than a width of the light exiting surface.

According to an embodiment of the invention, an included angle between the connecting surface and the second light incidence surface in the secondary optical element is within a range of 125 degrees to 145 degrees.

The light source module includes a plurality of light emitting elements and a plurality of the aforementioned secondary optical elements.

In summary, according to embodiments of the invention, the secondary optical elements can control the light emission pattern to reduce glare due to the designs of the first light incidence surface and the connecting surface. Moreover, because of the design of the free-form surface of the second light emitting surface, the secondary optical elements can also enhance the illumination uniformity. Furthermore, the secondary optical elements may be applied in frameworks with high light extraction efficiency (e.g. direct illumination type light source modules), thereby achieving glare reduction, uniform illumination, and also high light extraction efficiency.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
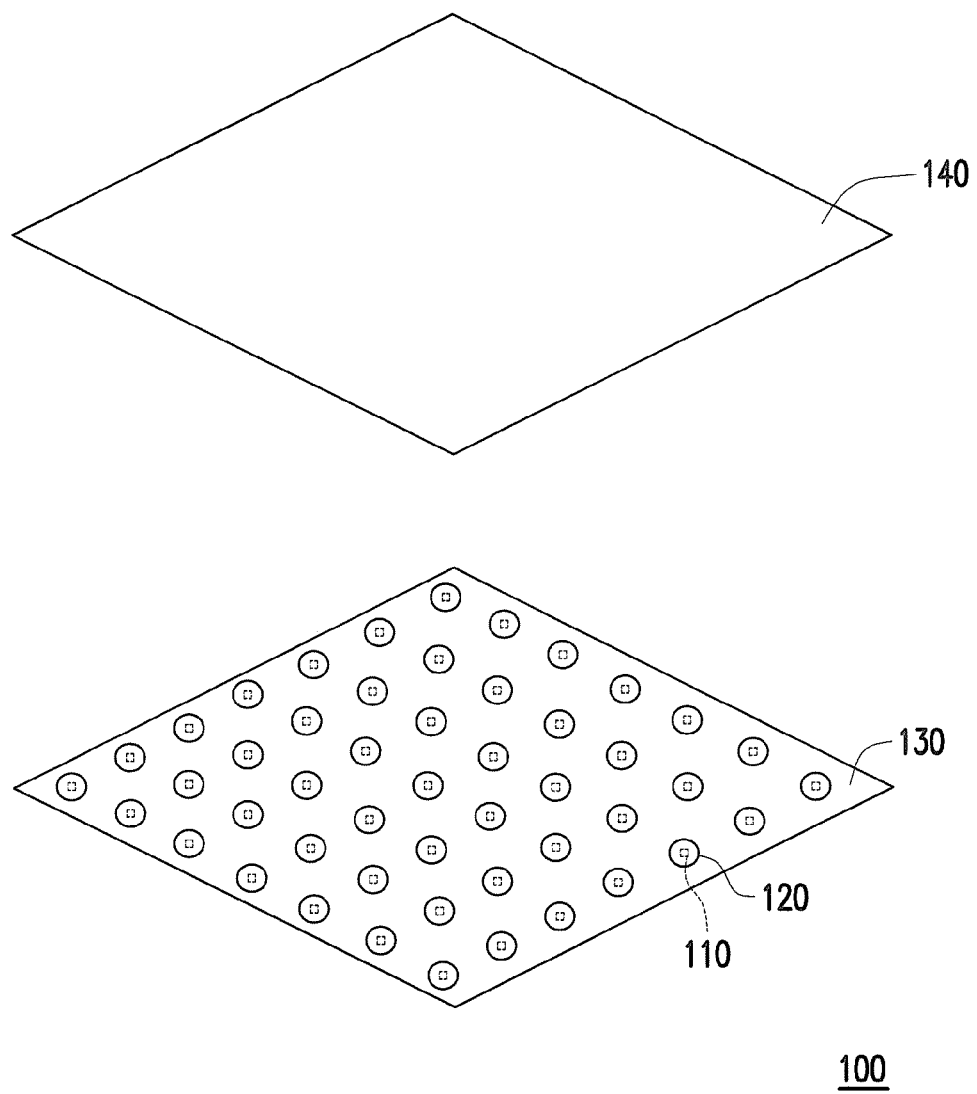
FIG. 1 is an exploded view of a light source module according to an embodiment of the invention.
Figure 2:
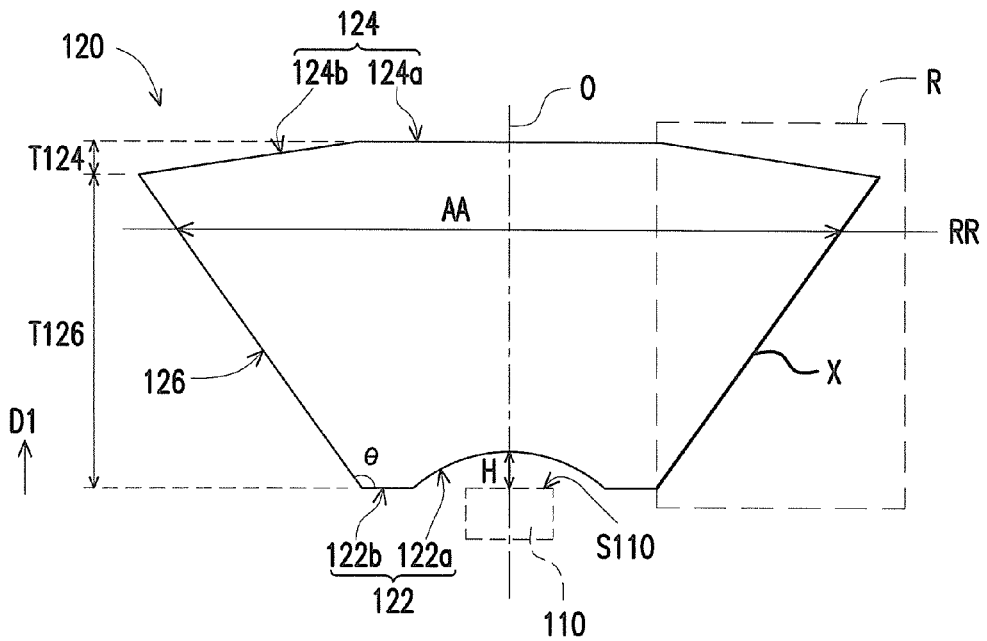
FIG. 2 is a first cross-sectional schematic view of a secondary optical element depicted in FIG. 1.
Figures 3, 4:
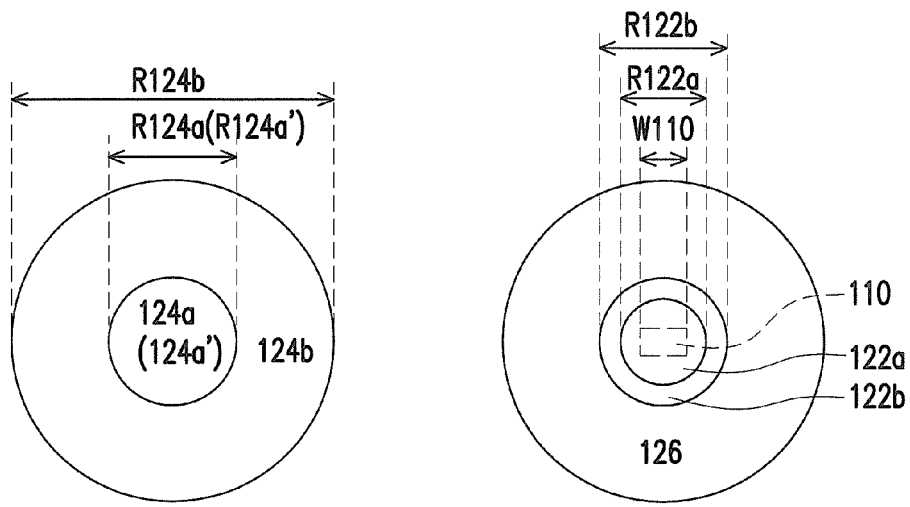
FIG. 3 is a top schematic view of the secondary optical element depicted in FIG. 1.
FIG. 4 is a bottom schematic view of the secondary optical element depicted in FIG. 1.

FIG. 1 is an exploded view of a light source module according to an embodiment of the invention. FIG. 2 is a first cross-sectional schematic view of a secondary optical element depicted in FIG. 1. FIG. 3 is a top schematic view of the secondary optical element depicted in FIG. 1. FIG. 4 is a bottom schematic view of the secondary optical element depicted in FIG. 1. With reference to FIGS. 1 and 2, a light source module 100 includes a plurality of light emitting elements 110 and a plurality of secondary optical elements 120. Each of the secondary optical elements 120 is adapted to be disposed over one of the light emitting elements 110, and the secondary optical elements 120 are configured to alter the light field pattern of the light emitting elements 110 and to make the illumination uniform. For example, each of the light emitting elements 110 may be a light emitting diode (LED), and each of the secondary optical elements 120 may be a secondary lens.

The light source module 100 may further include a circuit board 130, wherein the light emitting elements 110 are disposed on the circuit board 130 and arranged in an array, for example. Each of the secondary optical elements 120 is disposed on the circuit board 130 to correspond to one of the light emitting elements 110, and the light emitting elements 110 are located between the secondary optical elements 120 and the circuit board 130. The secondary optical elements 120 may be fixed on the circuit board 130 through adhesive layers, latches, or fixing elements. Moreover, according to different design requirements, the light source module 100 may further include at least one optical film 140 disposed on a light emitting side of the light source module 100, such as above the secondary optical elements 120. For example, when the optical film 140 is a diffuser, the luminance of the light source module 100 may be more uniform.

With reference to FIGS. 2-4, each of the secondary optical elements 120 include a light incidence surface 122, a light emitting surface 124, and a connecting surface 126. The light incidence surface 122 includes a first light incidence surface 122a and a second light incidence surface 122b surrounding the first light incidence surface 122a, and the first light incidence surface 122a is a curved surface recessed toward the light emitting surface 124.

The light emitting elements 110 has a light exiting surface S110 located below the first light incidence surface 122a, and a diameter R122a of the first light incidence surface 122a is larger than a width W110 of the light exiting surface S110. In the present embodiment, an orthographic projection of the first light incidence surface 122a completely covers an orthographic projection of the light exiting surface S110, such that the first light incidence surface 122a covers a light emitting range of the light emitting elements 110. In specifics, the width W110 of the light emitting surface S110 may be 3 mm, for example, and the diameter R122a of the first light incidence surface 122a is 6.58 mm.

The first light incidence surface 122a may be a circular arc surface. By configuring a maximum distance H between the light exiting surface S110 and the first light incidence surface 122a along a direction D1 perpendicular to the light exiting surface S110 to be less than a radius of curvature of the first light incidence surface 122a, the transmission paths of most of the light beams from the light exiting surface S110 after entering the secondary optical elements 120 are refracted due to Snell's law, thereby achieving a converging effect. The radius of curvature of the first light incidence surface 122a may be 5.148 mm, for example.

In the present embodiment, the second light incidence surface 122b may be designed as different types of surfaces, or other components may be disposed on the second light incidence surface 122b to bond with the circuit board 130 depicted in FIG. 1, and the invention does limit the type of the second light incidence surface 122b.

The light emitting surface 124 is opposite to the light incidence surface 122 and includes a first light emitting surface 124a and a second light emitting surface 124b surrounding the first light emitting surface 124a. Moreover, the first light incidence surface 122a, the second light incidence surface 122b, the first light emitting surface 124a, and the second light emitting surface 124b may have a same center axis O, for example.

In the present embodiment, the first light emitting surface 124a may be a flat surface, and the second light emitting surface 124b may be a free-form surface. The free-form surface design enhances the uniformity of the light emission illumination, for example by reducing the regional illumination difference on the target illumination plane corresponding to each of the light emitting elements 110. It should be noted that, an equation of the free-form surface and each parameter value in the equation may be determined according to different design requirements. Moreover, a ratio of the second light emitting surface 124b and the first light emitting surface 124a occupying the light emitting surface 124 (or the diameters of the second light emitting surface 124b and the first light emitting surface 124a) may also be determined according to the requirements. In the present embodiment, a diameter R124a of the first light emitting surface 124a may be the same as a diameter R122b of the second light incidence surface 122b, although the invention is not limited thereto. In addition, the diameters R122b and R124a may be 10 mm, for example, and a diameter R124b of the second light emitting surface 124b may be 25.3 mm.

The connecting surface 126 is connected between the second light incidence surface 122b and the second light emitting surface 124b. In the present embodiment, a section line X of the connecting surface 126 on a reference plane R perpendicular to the light exiting surface S110 is a straight line. Since the diameter R124b of the second light emitting surface 124b is larger than the diameter R122b of the second light incidence surface 122b, a cross-section area AA of the connecting surface 126 on a reference plane RR parallel to the light exiting surface S110 gradually increases from the second light incidence surface 122b toward the direction of the second light emitting surface 124b (i.e. direction D1).

Due to the slanted surface design of the connecting surface 126, the light beams transmitted to the connecting surface 126 are transmitted to the light emitting surface 124 because of the total reflection principle, such that a light emitting angle of the light emitting elements 110 can be further reduced. The design of an included angle θ between the connecting surface 126 and the second light incidence surface 122b in the secondary optical elements 120 can control the proportion of light beams emitted from the first light emitting surface 124a and the second light emitting surface 124b. In the present embodiment, the included angle θ between the connecting surface 126 and the second light incidence surface 122b in the secondary optical elements 120 may be within a range of 125 degrees to 145 degrees. Moreover, a thickness T126 of the connecting surface 126 along the direction D1 may be 9.5 mm, for example, and a thickness T124 of the light emitting surface 124 along the direction D1 may be 1.05 mm.

Compared to the side-lit panel light and the traditional grille lamp, the present embodiment configures secondary optical elements 120 in a direct illumination type light source with relatively high light extraction efficiency, so as to control the light emission pattern of the light emitting elements 110, and to eliminate the high luminance or luminance contrast within the field of vision. Accordingly, the present embodiment may reduce glare and enhance illumination uniformity while also have high light extraction efficiency.

Figure 5:
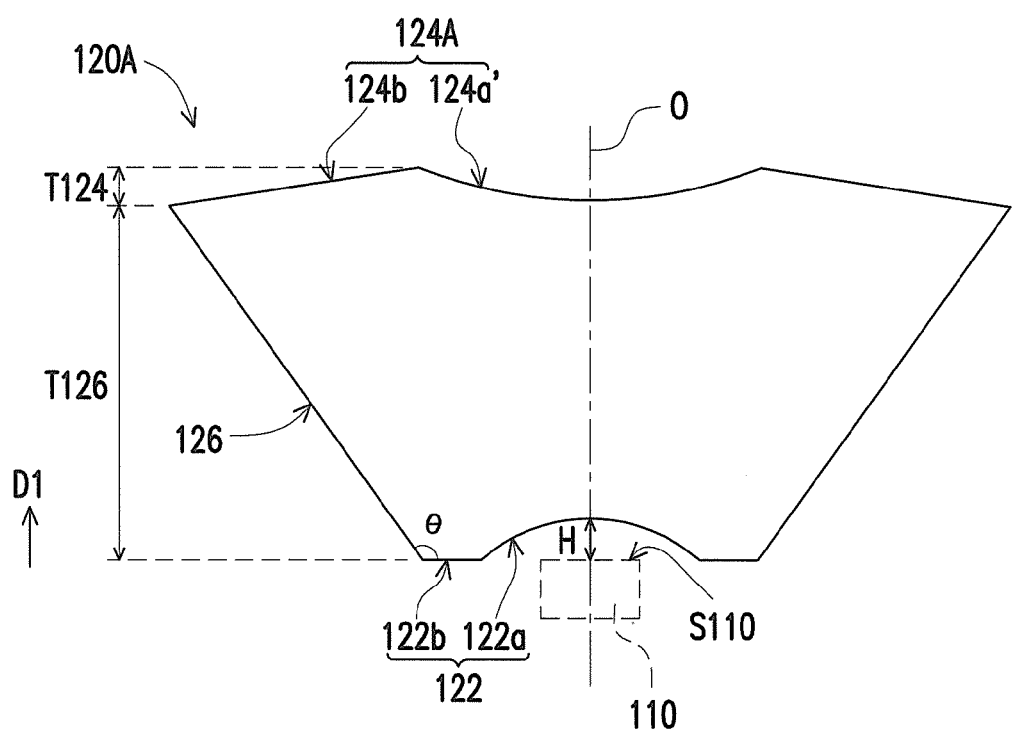
FIG. 5 is a second cross-sectional schematic view of the secondary optical element depicted in FIG. 1.

FIG. 5 is a second cross-sectional schematic view of the secondary optical element depicted in FIG. 1. With reference to FIG. 5, the secondary optical element 120A of the present embodiment is largely the same as the secondary optical element 120 depicted in FIGS. 2-4, and the same components are represented by the same reference labels, and further elaboration thereof is omitted hereafter. A main difference is that, a first light emitting surface 124a' is a free-form surface recessed toward the light incidence surface 122, in which an equation of the free-form surface and each parameter value in the equation may be determined according to different design requirements. Moreover, a ratio of the area (or diameter) of the second light emitting surface 124b and the first light emitting surface 124a' may also be determined according to the requirements. In the present embodiment, a diameter R124a' of the first light emitting surface 124a' (see FIGS. 2 and 3) may be the same as the diameter R122b of the second light incidence surface 122b, although the invention is not limited thereto.

In summary, according to embodiments of the invention, the secondary optical elements can control the light emission pattern to reduce glare due to the designs of the first light incidence surface and the connecting surface. Moreover, because of the design of the free-form surface of the second light emitting surface, the secondary optical elements can also enhance the illumination uniformity. Furthermore, the secondary optical elements may be applied in frameworks with high light extraction efficiency (e.g. direct illumination type light source modules), thereby achieving glare reduction, uniform illumination, and also high light extraction efficiency.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. A secondary optical element adapted to be disposed over a light emitting element, the secondary optical element comprising a light incidence surface, a light emitting surface, and a connecting surface, wherein the light incidence surface comprises a first light incidence surface and a second light incidence surface surrounding the first light incidence surface, and the first light incidence surface is a curved surface recessed toward the light emitting surface, the light emitting surface is opposite to the light incidence surface and comprises a first light emitting surface and a second light emitting surface surrounding the first light emitting surface, the first light emitting surface is a flat surface or a curved surface recessed toward the light incidence surface, the second light emitting surface is an inclined surface connecting the first light emitting surface and the connecting surface, a diameter of the second light emitting surface is larger than a diameter of the second light incidence surface, and the connecting surface is connected between the second light incidence surface and the second light emitting surface, wherein the first light incidence surface is a circular arc surface, the light emitting element having a light exiting surface located below the first light incidence surface, and a maximum distance between the light exiting surface and the first light incidence surface along a direction perpendicular to the light exiting surface is less than a radius of curvature of the first light incidence surface.

2. The secondary optical element according to claim 1, wherein the first light incidence surface, the second light incidence surface, the first light emitting surface, and the second light emitting surface have a same center axis.

3. The secondary optical element according to claim 1, wherein a diameter of the first light incidence surface is larger than a width of the light exiting surface.

4. The secondary optical element according to claim 1, wherein an included angle between the connecting surface and the second light incidence surface in the secondary optical element is within a range of 125 degrees to 145 degrees.

5. A light source module, comprising:
a plurality of light emitting elements; and
a plurality of secondary optical elements, wherein each of the secondary optical elements is adapted to be disposed over one of the light emitting elements, and each of the secondary optical elements comprises a light incidence surface, a light emitting surface, and a connecting surface, wherein the light incidence surface comprises a first light incidence surface and a second light incidence surface surrounding the first light incidence surface, and the first light incidence surface is a curved surface recessed toward the light emitting surface, the light emitting surface is opposite to the light incidence surface and comprises a first light emitting surface and a second light emitting surface surrounding the first light emitting surface, the first light emitting surface is a flat surface or a curved surface recessed toward the light incidence surface, the second light emitting surface is an inclined surface connecting the first light emitting surface and the connecting surface, a diameter of the second light emitting surface is larger than a diameter of the second light incidence surface, and the connecting surface is connected between the second light incidence surface and the second light emitting surface, wherein the first light incidence surface is a circular arc surface, the light emitting element having a light exiting surface located below the first light incidence surface, and a maximum distance between the light exiting surface and the first light incidence surface along a direction perpendicular to the light exiting surface is less than a radius of curvature of the first light incidence surface.

6. The light source module according to claim 5, wherein the first light incidence surface, the second light incidence surface, the first light emitting surface, and the second light emitting surface have a same center axis.

7. The light source module according to claim 5, wherein a diameter of the first light incidence surface is larger than a width of the light exiting surface.

8. The light source module according to claim 5, wherein an included angle between the connecting surface and the second light incidence surface in the secondary optical element is within a range of 125 degrees to 145 degrees.

* * * * *